(No Model.)
P. G. NEISENDORFER.
GATE VALVE.
No. 286,475. Patented Oct. 9, 1883.
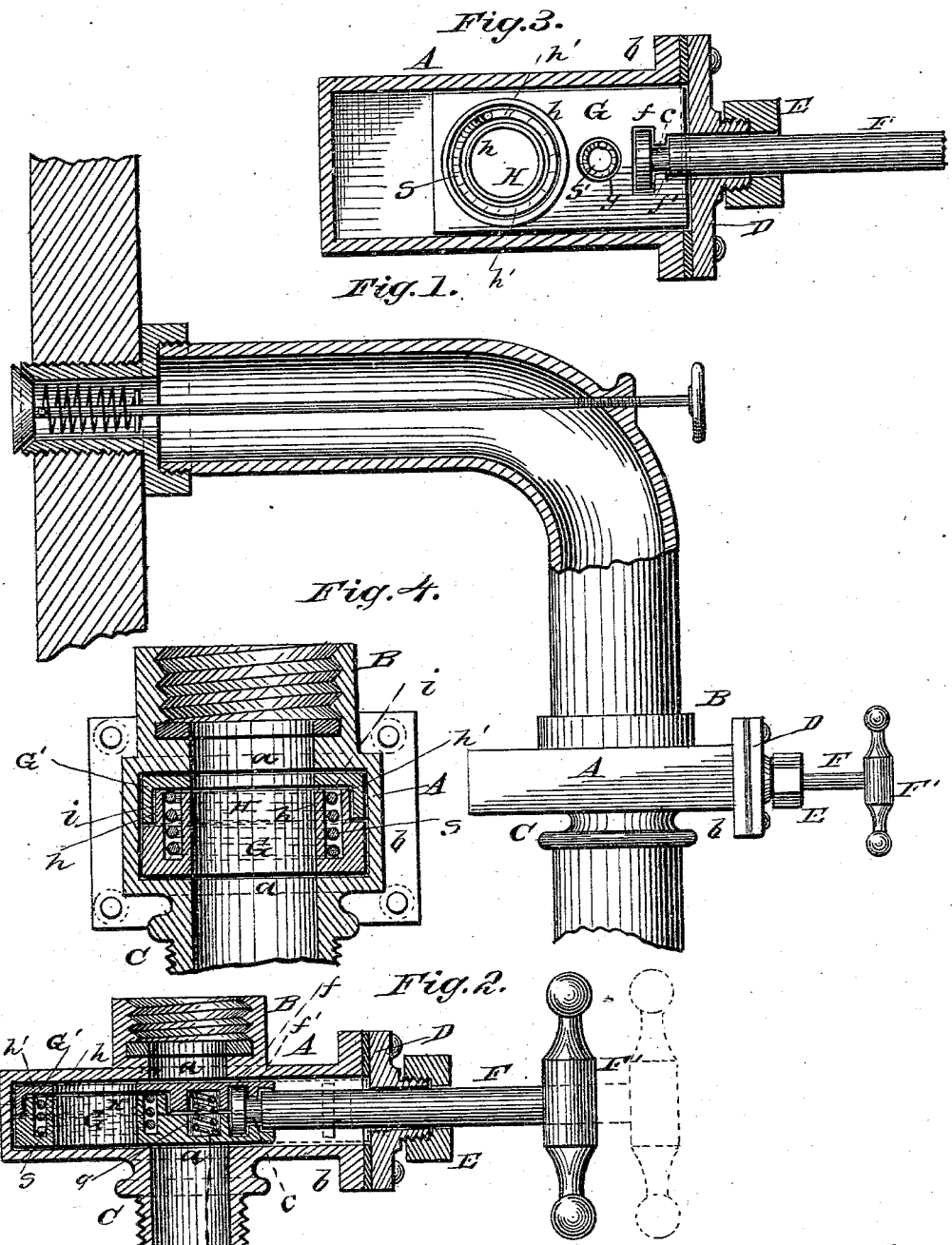
Witnesses:
Phil. C. Patrick.
W. R. Keyworth.
Inventor:
P. G. Neisendorfer
by
J. H. Alexander
Attorney.

UNITED STATES PATENT OFFICE.

PETER G. NEISENDORFER, OF BALTIMORE, MARYLAND.

GATE-VALVE.

SPECIFICATION forming part of Letters Patent No. 286,475, dated October 9, 1883.

Application filed February 19, 1883. (No model.)

*To all whom it may concern:*

Be it known that I, PETER GEORGE NEISENDORFER, of Baltimore, in the county of Baltimore and State of Maryland, have invented certain new and useful Improvements in Gate-Valves; and I do hereby declare that the following is a full, clear, and exact description thereof, reference being had to the accompanying drawings, and to the letters of reference marked thereon, which form part of this specification, in which—

Figure 1 is a view partly in section of my valve-gate applied to the nozzle of a beer-tank for the purpose of racking off beer into kegs or barrels. Fig. 2 is a vertical section of the valve-gate, showing the gate in two positions by the aid of dotted lines. Fig. 3 is a horizontal section. Fig. 4 is a transverse sectional view of my improved device.

This invention relates to gates or straight sliding valves, which are especially designed for use in connection with the goose-necks of beer hogsheads or tanks, from which beer is racked off into kegs; and my invention consists in a gate composed of two plates, having expansion-springs interposed between them, in a manner which will be fully understood from the following description, when taken in connection with the annexed drawings.

Beer-brewers know that it is necessary to rack their beer quickly, in order to prevent the external air from mixing with it. The common method of taking beer from tanks or large vessels and introducing the beer into barrels or casks is to tap the tanks and to draw off by means of flexible hose or pipes, the taps being provided with internal valves, the stems of which are screw-threaded and have external handles. My object is to apply to the nozzle of the draw-off-cock a valve which can be operated instantaneously to cut off and allow a free flow of fluid, and which will be self-packing.

A designates a rectangular valve-box, which is constructed with a tubular neck, B, having a female screw-thread on one side and a tubular neck, C, having a male thread on the opposite side. The axes of two screw-couplings, B C, coincide, and at their inner ends are formed ground annular valve-seats $a\,a$, which are raised from the internal surfaces of the box A. One end of this box is contructed with a rectangular flange, $b$, which is adapted to receive a cap, D, of a shape and size corresponding to the flange $b$ of the box A. This cap is secured to the box-flange by screws, with an interposed packing, and through a stuffing-box, E, of said cap passes a rod, F, on the outer end of which is a T-handle or hand-grip, F', by means of which the rod F can be moved endwise without turning it about its axis. This rod is annularly grooved near its inner end, as indicated at $c$.

G G' designate two rectangular valve or gate plates, the outer surfaces of which are dressed, so as to form close face-joints with the seats $a\,a$. The inner side of the valve or gate plate G is cast with a semi-annular groove, $f$, a semi-circular depression, $f'$, a socket, $g$, and circular concentric flanges $h\,h$, between which is a groove, $h'$, and within which is a hole, H, directly through the plate G. The inner side of the valve or gate plate G' is the duplicate of the valve-plate G, with this exception, that surrounding the hole H through this plate G' is a circular depression, $i$, into which the concentric flanges $h\,h$ are allowed to play.

S designates a coiled spring, which is applied in the groove $h'$, and which bears against that part of the web which immediately surrounds the hole through the plate G'.

S' designates a coiled spring of a comparatively small diameter, which is fitted into the socket $g$.

It is obvious that the gate-valve which I have above described is expansible and self-adaptable to its seats irrespective of the valve-rod, which rod, while it is allowed to turn freely about its axis, is also the means by which the gate is endwise movable to open and shut the fluid-way through the box A. The springs S S' act to spread apart the valve-plates G G', and to hold them positively against the valve-seats in the box A, so that the wearing of the bearing-faces of the said plates and seats is compensated for.

It will be seen by my invention that I can change the hose and direct the stream of beer from one hogshead to another without any loss of beer. My valve may be attached to the end of a hose for discharging beer directly through the holes of barrels or casks.

Having thus fully described my invention, what I claim as new, and desire to secure by Letters Patent, is—

1. A gate-valve consisting of a rectangular valve-box having couplings B C and internal valve-seats, in combination with the two perforated plates constituting the gate-valve, one or more springs between said plates, and a valve-rod, all constructed and adapted to operate substantially in the manner and for the purposes described.

2. In a gate-valve, the combination of the valve-box having external couplings and internal valve-seats, and a gate-valve formed of two perforated plates having concentric flanges h h, a circular depression to receive said flanges, and one or more expanding-springs, all constructed and adapted to operate substantially in the manner and for the purposes described.

In testimony that I claim the foregoing as my own I affix my signature in presence of two witnesses.

P. G. NEISENDORFER.

Witnesses:
F. O. McCLEARY,
W. R. KEYWORTH.